(12) United States Patent (10) Patent No.: US 9,135,935 B1
Mallary et al. (45) Date of Patent: Sep. 15, 2015

(54) CUSTOMIZED HEAD GIMBAL ASSEMBLY BONDING SKEW ANGLE FOR ADJUSTING TWO-DIMENSIONAL MAGNETIC RECORDING READER ALIGNMENT

(71) Applicant: Western Digital Technologies, Inc., Irvine, CA (US)

(72) Inventors: Michael L. Mallary, Sterling, MA (US); Gerardo A. Bertero, Redwood City, CA (US); Shaoping Li, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/099,849

(22) Filed: Dec. 6, 2013

Related U.S. Application Data

(60) Provisional application No. 61/890,122, filed on Oct. 11, 2013.

(51) Int. Cl.
  *G11B 21/21* (2006.01)
  *G11B 5/48* (2006.01)
  *G11B 5/60* (2006.01)

(52) U.S. Cl.
  CPC ........... *G11B 5/4826* (2013.01); *Y10T 29/4903* (2015.01); *Y10T 29/49028* (2015.01)

(58) Field of Classification Search
  None
  See application file for complete search history.

(56) References Cited

U.S. PATENT DOCUMENTS

| | | |
|---|---|---|
| 3,780,266 A | 12/1973 | Mudsam et al. |
| 4,012,781 A | 3/1977 | Lin |
| 4,597,023 A | 6/1986 | Rijckaert |
| 4,761,699 A * | 8/1988 | Ainslie et al. ............ 360/234.5 |
| 5,229,901 A | 7/1993 | Mallary |
| 5,270,892 A | 12/1993 | Naberhuis |
| 5,309,305 A | 5/1994 | Nepela et al. |
| 5,321,557 A | 6/1994 | Shimotashiro et al. |
| 5,353,176 A | 10/1994 | Kosuge |
| 5,388,014 A | 2/1995 | Brug et al. |
| 5,508,868 A | 4/1996 | Cheng et al. |
| 5,523,904 A | 6/1996 | Saliba |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,071,007 A | 6/2000 | Schaenzer et al. |
| 6,075,673 A | 6/2000 | Wilde et al. |
| 6,097,575 A | 8/2000 | Trang et al. |
| 6,104,562 A | 8/2000 | Ottesen et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |

(Continued)

*Primary Examiner* — Craig A. Renner

(57) ABSTRACT

System and methods are illustrated for customizing the HGA bonding skew angle of a TDMR slider including a plurality of readers to adjust reader alignment relative to a track location on disk media. Overlay error caused by manufacturing variations is compensated for by adjusting the skew angle of the slider when it is bonded to the suspension to form the HGA. Process operations for manufacturing a TMDR HDD include manufacturing a multiple reader, multiple layer TDMR slider, determining an overlay error in the slider, determining a slider bonding skew angle based on the determined overlay error and other parameters, and bonding the slider to a HDD suspension at the determined bonding skew angle.

13 Claims, 5 Drawing Sheets

(56) References Cited

U.S. PATENT DOCUMENTS

| | | |
|---|---|---|
| 6,144,528 A | 11/2000 | Anaya-Dufresne et al. |
| 6,147,838 A | 11/2000 | Chang et al. |
| 6,151,196 A | 11/2000 | Carlson et al. |
| 6,154,335 A | 11/2000 | Smith et al. |
| 6,157,510 A | 12/2000 | Schreck et al. |
| 6,178,064 B1 | 1/2001 | Chang et al. |
| 6,181,522 B1 | 1/2001 | Carlson |
| 6,181,673 B1 | 1/2001 | Wilde et al. |
| 6,191,925 B1 | 2/2001 | Watson |
| 6,216,242 B1 | 4/2001 | Schaenzer |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,271,998 B1 | 8/2001 | Coehoorn et al. |
| 6,311,551 B1 | 11/2001 | Boutaghou |
| 6,330,131 B1 | 12/2001 | Nepela et al. |
| 6,339,518 B1 | 1/2002 | Chang et al. |
| 6,341,102 B1 | 1/2002 | Sato et al. |
| 6,349,017 B1 | 2/2002 | Schott |
| 6,369,982 B2 | 4/2002 | Saliba |
| 6,373,660 B1 | 4/2002 | Lam et al. |
| 6,378,195 B1 | 4/2002 | Carlson |
| 6,449,131 B2 | 9/2002 | Guo et al. |
| 6,462,541 B1 | 10/2002 | Wang et al. |
| 6,496,333 B1 | 12/2002 | Han et al. |
| 6,522,504 B1 | 2/2003 | Casey |
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,674,618 B2 | 1/2004 | Engel et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,842,312 B1 | 1/2005 | Alstrin et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,921,592 B2 | 7/2005 | Tani et al. |
| 6,937,439 B1 | 8/2005 | Chang et al. |
| 6,947,247 B2 | 9/2005 | Schwarz et al. |
| 6,956,718 B1 | 10/2005 | Kulkarni et al. |
| 6,972,930 B1 | 12/2005 | Tang et al. |
| 6,995,957 B2 | 2/2006 | Jayasekara |
| 7,002,777 B2 | 2/2006 | Ogawa et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,106,549 B2 | 9/2006 | Asakura |
| 7,174,622 B2 | 2/2007 | Meyer et al. |
| 7,193,807 B1 | 3/2007 | Liikanen et al. |
| 7,215,514 B1 | 5/2007 | Yang et al. |
| 7,239,465 B1 | 7/2007 | Watson et al. |
| 7,242,547 B2 | 7/2007 | Ogawa |
| 7,259,927 B2 | 8/2007 | Harris |
| 7,271,970 B2 | 9/2007 | Tsuchiya |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,324,303 B2 | 1/2008 | Ozue et al. |
| 7,382,585 B1 | 6/2008 | Nibarger et al. |
| 7,405,907 B2 | 7/2008 | Raastad |
| 7,408,730 B2 | 8/2008 | Yamagishi |
| 7,414,814 B1 | 8/2008 | Pan |
| 7,420,758 B2 | 9/2008 | Inoue et al. |
| 7,436,631 B1 | 10/2008 | Fanslau, Jr. et al. |
| 7,436,632 B2 | 10/2008 | Li et al. |
| 7,453,671 B1 | 11/2008 | Nibarger et al. |
| 7,474,508 B1 | 1/2009 | Li et al. |
| 7,477,486 B1 | 1/2009 | Sun et al. |
| 7,502,193 B2 | 3/2009 | Albrecht et al. |
| 7,551,393 B2 | 6/2009 | Biskeborn et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,619,194 B2 | 11/2009 | Kobashi |
| 7,652,847 B2 | 1/2010 | Weiss et al. |
| 7,656,610 B1 | 2/2010 | Campos et al. |
| 7,729,089 B1 | 6/2010 | Hogan |
| 7,751,148 B1 | 7/2010 | Alstrin et al. |
| 7,755,863 B2 | 7/2010 | Neumann et al. |
| 7,995,310 B1 | 8/2011 | Pan |
| 8,009,388 B2 | 8/2011 | Oh et al. |
| 8,081,400 B1 | 12/2011 | Hu |
| 8,087,973 B1 | 1/2012 | Sladek et al. |
| 8,089,730 B1 | 1/2012 | Pan et al. |
| 8,139,301 B1 | 3/2012 | Li et al. |
| 8,144,424 B2 | 3/2012 | Dugas et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,208,228 B2 | 6/2012 | Maat et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,508 B1 | 12/2013 | Burd |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,711,517 B2 | 4/2014 | Erden et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |

(56) References Cited

U.S. PATENT DOCUMENTS

| | | |
|---|---|---|
| 8,786,987 B2 | 7/2014 | Edelman et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2003/0151855 A1 | 8/2003 | Molstad et al. |
| 2004/0184181 A1 | 9/2004 | Fukuda et al. |
| 2005/0036241 A1 | 2/2005 | Tsuda et al. |
| 2005/0036437 A1 | 2/2005 | Learned et al. |
| 2007/0242378 A1 | 10/2007 | Ikegami et al. |
| 2008/0203279 A1 | 8/2008 | Kobashi |
| 2010/0020435 A1 | 1/2010 | Chen et al. |
| 2012/0282492 A1 | 11/2012 | Sasaki et al. |
| 2013/0244541 A1 | 9/2013 | Yaemglin et al. |
| 2013/0286502 A1 | 10/2013 | Erden et al. |
| 2013/0293982 A1 | 11/2013 | Huber |
| 2014/0160590 A1 | 6/2014 | Sankaranarayanan et al. |

\* cited by examiner

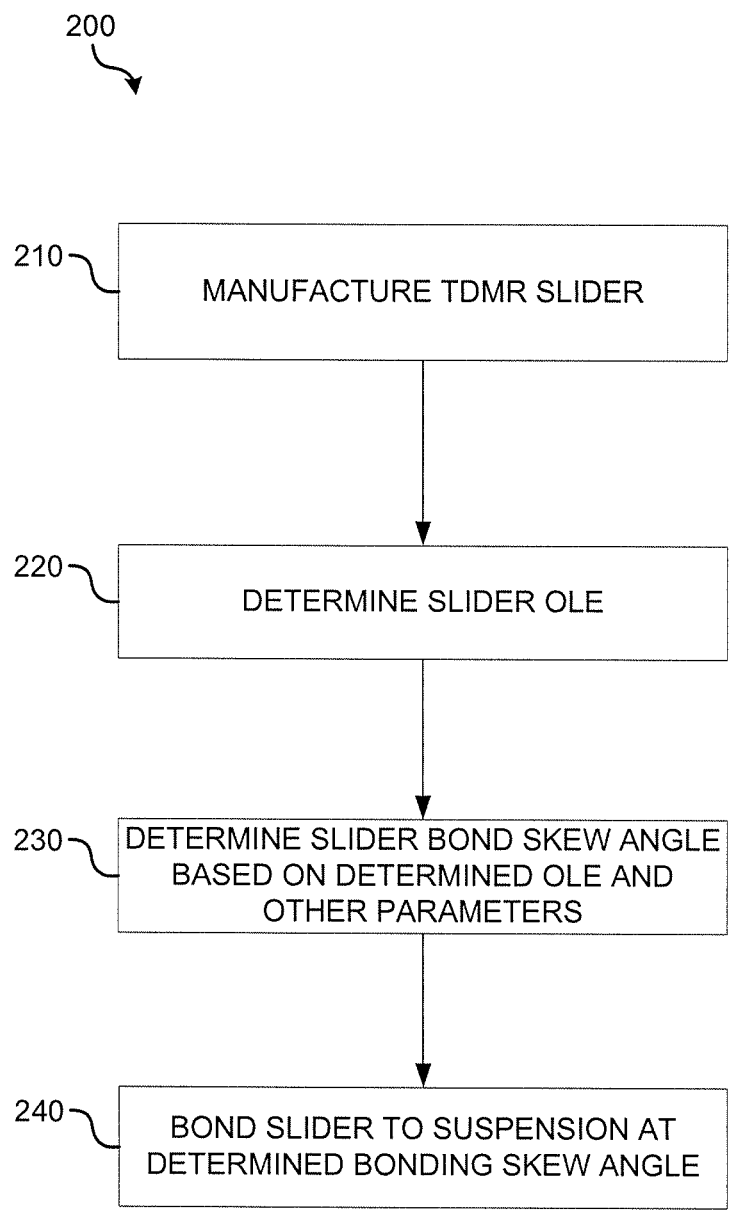

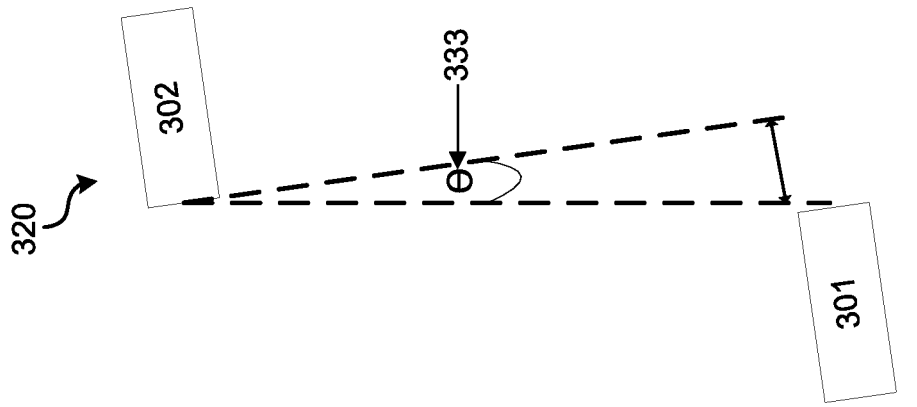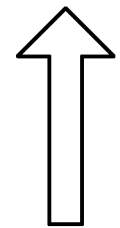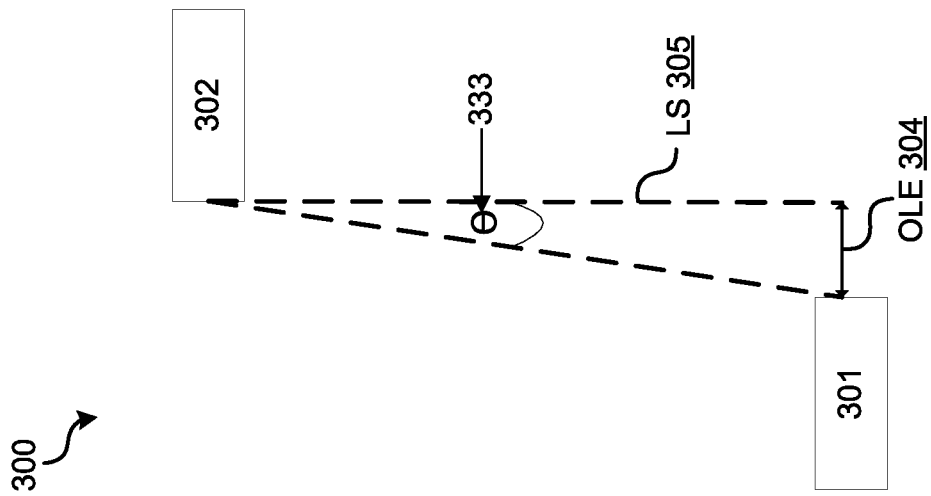
Fig. 3

CUSTOMIZED HEAD GIMBAL ASSEMBLY BONDING SKEW ANGLE FOR ADJUSTING TWO-DIMENSIONAL MAGNETIC RECORDING READER ALIGNMENT

CROSS-REFERENCE TO RELATED APPLICATIONS

This application claims the benefit of U.S. Provisional Application Ser. No. 61/890,122, filed Oct. 11, 2013, which is incorporated herein by reference in its entirety.

BACKGROUND

In magnetic storage devices such as hard disk drives (HDD), read and write heads are used to magnetically read and write information to and from the storage media. In a HDD, data is stored on one or more disks in a series of adjacent concentric circles. A HDD comprises a rotary actuator, a suspension mounted on an arm of the rotary actuator, and a slider bonded to the suspension to form a head gimbal assembly (HGA). In a traditional HDD, the slider carries a write head and read head, and radially floats over the surface of the disk under the control of a servo control system that selectively positions a head over a specific track of the disk. In this one read head (reader) configuration, the reader is aligned over the center of a track for data read back.

As HDD storage capacities have increased, the data track separation has decreased and the density has increased. However, as adjacent tracks are moved closer together, noise interference from adjacent tracks during data read back, Inter-Track Interference (ITI), becomes an increasing concern. If there is too much ITI, data may not be readable from a track. This places a limitation on the storage density of traditional one reader head per slider hard disk drive assemblies.

Two-Dimensional Magnetic Recording (TDMR) has recently been developed for pushing magnetic media storage densities for hard disk drives (HDD) well beyond 1 Tb/in$^2$. In TDMR HDD assemblies, the slider comprises a plurality of reader heads: at least one data track reader, and one or more ITI noise cancelling readers. In this arrangement, the ITI signals that corrupt the data being recovered from a data track of interest can be cancelled by reading at least one of the adjacent (interfering) tracks and using the read signals to cancel the ITI on the data read from the data track of interest. Current manufacturing process limitations, where adjacent readers are separated by at least two track pitches (center to center) require that these plurality of readers be manufactured on at least two or more layers separated by a longitudinal distance. There are, however, process variations during manufacture of the readers on different layers. In particular, photolithography limitations induce a variable Overlay Error (OLE) during manufacture. Accordingly, systems and methods for correcting this OLE are desired.

BRIEF DESCRIPTION OF THE DRAWINGS

The present application is illustrated by way of example, and not limitation, in the figures of the accompanying drawings in which:

FIG. 2 is an operational flow diagram illustrating an exemplary TDMR HDD manufacturing process that corrects for the variable OLE illustrated in FIGS. 1A-1C FIG. 3 is a top view illustrating an exemplary two-reader, two-layer TDMR slider configuration before bonding the slider to the suspension and after bonding the slider to the suspension at a determined bonding skew angle in accordance with the process of FIG. 2.

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

Figure 1C:
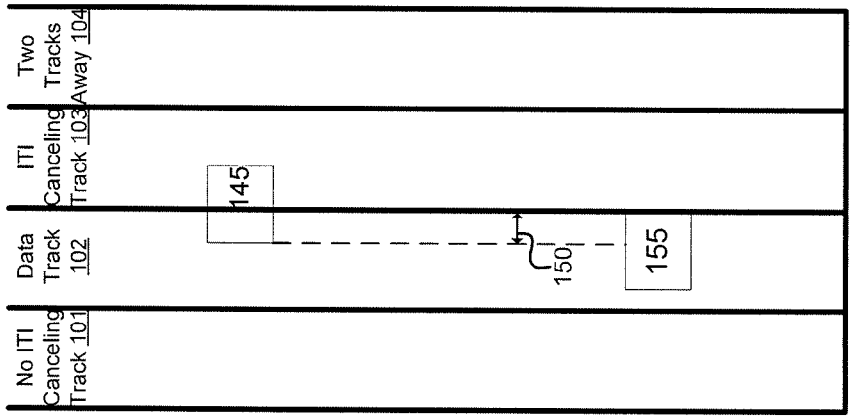
FIGS. 1A-1C illustrate the slider OLE variability in processes for manufacturing a two-reader TDMR in accordance with the present disclosure.
Figure 1B:
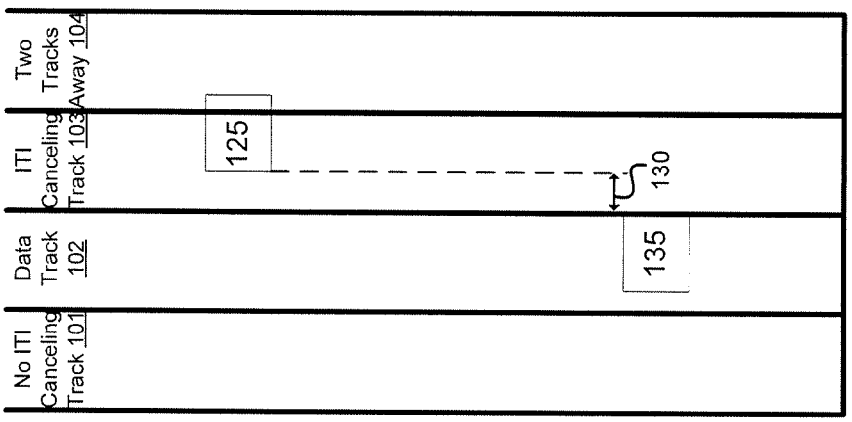
Figure 1A:
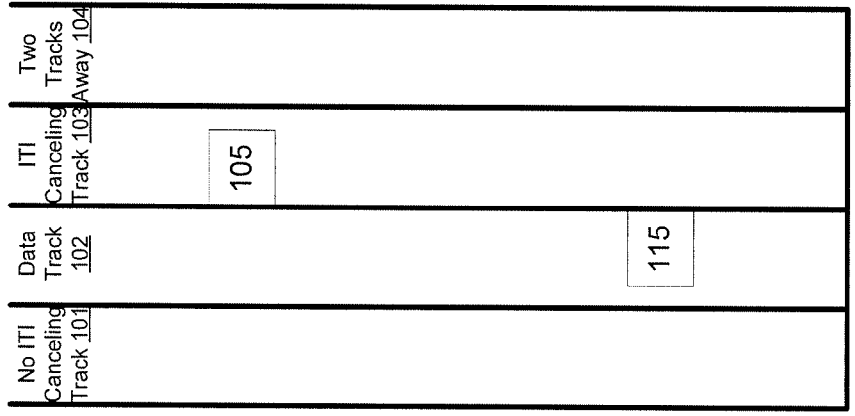

FIGS. 1A-1C illustrate the slider OLE variability relative to disk media data tracks 101-104 in processes for manufacturing a two-reader TDMR in accordance with the present disclosure. In the illustrated embodiments, data is read from data track 102 by a reader (115, 135, or 155) while a corresponding adjacent IT noise canceling reader (105, 125, or 145) reads an adjacent ITI canceling track 103. The ITI signals that corrupt the data read from data track 102 may be canceled by using the read signals from ITI canceling track 103. Also illustrated are track 101 (not used for ITI canceling) and track 104, which is two tracks away from data track 102.

FIG. 1A illustrates the desired configuration of data track reader 115 and ITI noise canceling reader 105. In this desired configuration, the OLE between the two readers is zero. However process variations in the manufacture of the two-reader TDMR may result in the configurations shown in FIGS. 1B-1C. FIG. 1B illustrates a positive OLE 130 between a data track reader 135 and an ITI noise canceling reader 125. FIG. 1C illustrates a negative OLE 150 between a data track reader 155 and an ITI noise canceling reader 145. This variable OLE appears because of limits in the definable critical dimension during manufacture of these multi-layer, multi-reader assemblies.

In accordance with the present disclosure, system and methods are illustrated for customizing the HGA bonding skew angle of a TDMR slider to adjust reader alignment relative to a track location on a disk media. In the illustrated embodiments, OLE caused by manufacturing variations is compensated for by adjusting the skew angle of the slider when it is bonded to the suspension to form the HGA.

FIG. 2 is an operational flow diagram illustrating an exemplary TDMR HDD manufacturing process 200 that corrects for the variable OLE illustrated in FIGS. 1A-1C. FIG. 2 will be described in conjunction with FIG. 3, which is a top view illustrating an exemplary two-reader, two-layer TDMR slider configuration before bonding the slider to the suspension and after bonding the slider to the suspension at a determined bonding skew angle in accordance with the process of FIG. 2. For simplicity some operations are omitted from the description of process 200.

At operation 210, a TDMR slider comprising a plurality of reads distributed over a plurality of readers is manufactured. Variations in photolithographic OLE during manufacture of the TDMR slider may result in readers with a positive OLE, a negative OLE, or no OLE. FIG. 3 illustrates an example two-reader, two-layer configuration 300 after manufacture of a TDMR slider. In this example, readers 301 and 302 have a positive OLE 304. At operation 220, the slider OLE is determined. In one embodiment, determination of the slider OLE comprises imaging the plurality of readers at an air-bearing surface (ABS) using a suitable imaging device such as for example, a scanning electron microscope (SEM). In other embodiments, an atomic force microscope (AFM) may be used take images of the reader array at the ABS.

At operation 230, the slider bond skew angle for bonding it to a suspension is determined based on the determined slider OLE and other parameters. In one embodiment, the slider bonding skew angle is the slider bonding angle to the suspension that minimizes or eliminates slider OLE relative to a track location on a magnetic read media. In other embodiments, the slider bonding skew angle may depend on an acceptable maximum bonding angle and/or an acceptable amount of OLE correction. For example, if the OLE between two readers in a two reader TDMR configuration is acceptable based on predetermined process parameters, the slider may be bonded to the suspension with no skew. In embodiments where there is no OLE between the slider's plurality of readers, the bonding skew angle is zero, i.e. the slider may be bonded to the suspension with no skew.

The determined bonding skew angle for a slider to the suspension may depend on a function comprising one or more of the following parameters: the OLE error between adjacent readers (i.e. positive or negative separation between readers), the longitudinal separation between readers, the magnetic read media data track width, the reader width, the reader length, the reader height, and the reader shape. In some embodiments, the available skew angle adjustment range is approximately −10 to +10 degrees, and the OLE range is approximately −50 nm to 50 nm. In one particular embodiment, the OLE is approximately 10 nm, the layer separation (longitudinal distance between readers) is approximately 70 nm, and the skew adjustment angle is approximately 8 degrees. FIG. 3 illustrates a determined bonding skew angle 333 for a two-reader, two-layer TMDR comprising a positive OLE 304 and a longitudinal separation 305 between readers 301 and 302. In this example, the bonding skew angle 333 is selected to eliminate OLE 304 relative to a track location on magnetic read media.

At operation 240, the slider is bonded to the HDD suspension at the determined bonding skew angle. In one embodiment, the sliders may be bonded at a desired skew angle using bins. Based on the ABS images and the determined bonding skew angle, the slider may be grouped into bins with appropriate bonding angle difference between bins. For example, bins may be grouped with an angular step difference between bins. The step size of a bin may be predefined based on a mounting skew tolerance range. In one embodiment, a step size is 2 degrees. In such an embodiment, for example, 9 bins would cover +/−8 degrees (i.e. a range of 16 degrees) of skew error. In this embodiment, each bin would comprise a tailored HGA mounting fixture and customized Flex Print with appropriately located bonding pads for bonding to the slider bonding pads. In one embodiment, gold ball bonding is used for bonding to the pads. In this exemplary embodiment, the number of bonding parts may depend on the skew angle.

Configuration 320 of FIG. 3 illustrates the example two-reader, two-layer arrangement after bonding the slider to the suspension at determined bonding skew angle 333. As illustrated in FIG. 3, bonding skew angle 333 eliminates OLE 304 relative to a track location on a magnetic read media. This provides the benefit improving read accuracy and reducing ITI during read operations.

Figure 4:
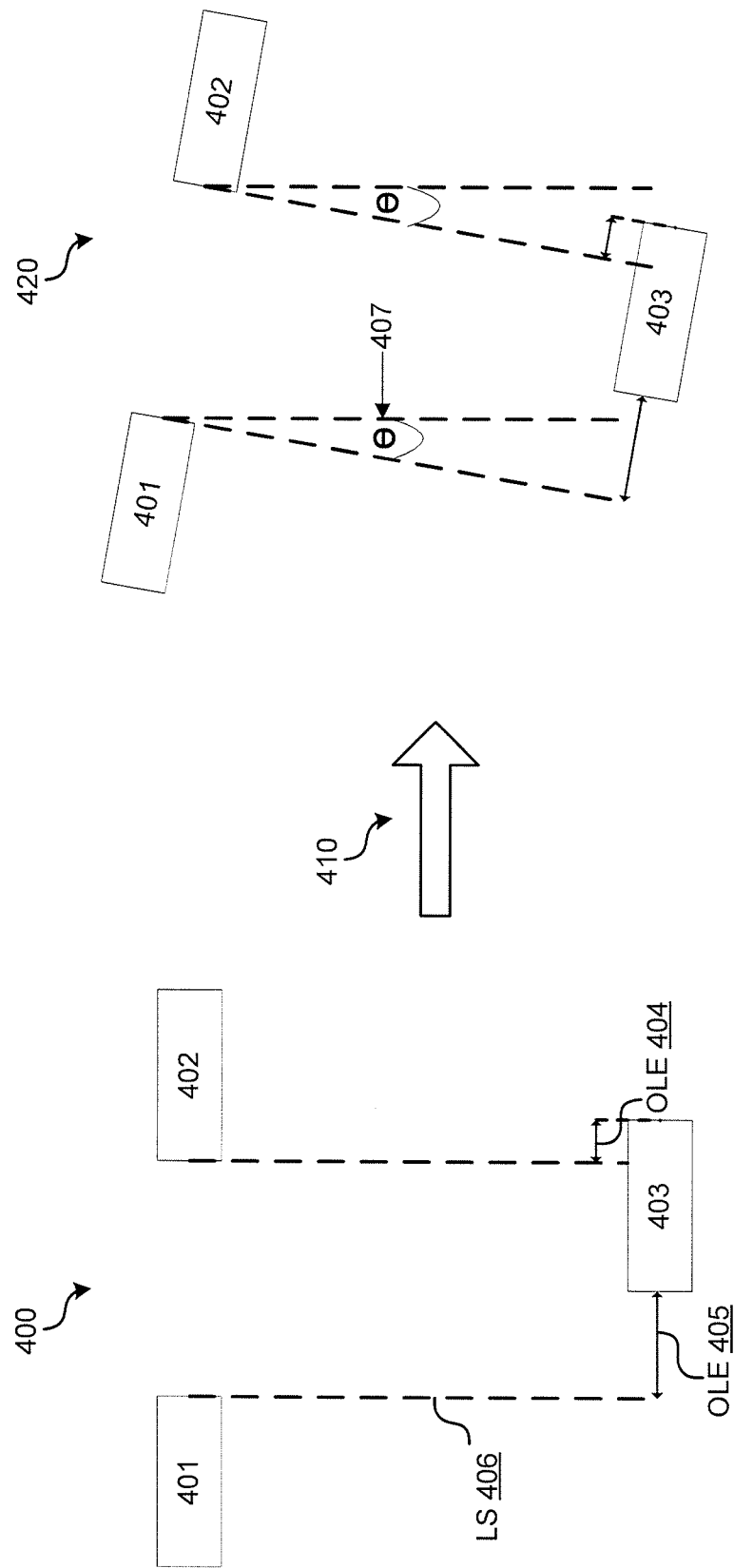
FIG. 4 is a top view illustrating an exemplary three-reader, two-layer TDMR slider configuration before bonding the slider to the suspension and after bonding the slider to the suspension at a determined bonding skew angle in accordance with the process of FIG. 2.

FIG. 4 is a top view illustrating an exemplary three-reader, two-layer TDMR slider configuration before bonding the slider to the suspension (configuration 400) and after bonding the slider to the suspension (configuration 420) at a determined bonding skew angle 407 in accordance with the process of FIG. 2. In this exemplary embodiment, three readers 401, 402, and 403 are manufactured on two separate layers. Flanking Readers 401 and 402 are manufactured on the same layer and may be manufactured with a predetermined separation distance to allow sufficient space for a permanent magnetic bias between the two readers. In one example embodiment, the predetermined separation distance between readers 401 and 402 is at least two track pitches. As illustrated in FIG. 4, reader 403 is formed on a layer with longitudinal separation 406 from the layer used to form readers 401 and 402. In an alternative embodiment, reader 403 may be formed on a layer above the layer used to form readers 401 and 402. The slider, initially manufactured in configuration 400, is bonded to a HDD HGA at bonding angle 407 through bonding operation 410, resulting in configuration 420.

In example configuration 400, there are two overlay errors: OLE 405 between flanking reader 401 and reader 403, and OLE 404 between flanking reader 402 and reader 403. In alternative embodiments, initial configuration 400 may comprise one or no OLE (e.g. reader 403 is aligned with reader 401 and/or reader 402), in which case the bonding skew angle may be zero. Determination of a bonding skew angle 407 may be based on OLE 404, OLE 405, LS 406, and other parameters. In this particular example, the skew angle is determined such that reader 403 is approximately centered between adjacent readers 401 and 402. Depending on longitudinal separation 406, the dimensions of the readers, OLE 404, and OLE 405, centering reader 403 during bonding operation 410 at skew angle 407 may reduce or eliminate OLE 404, OLE 405, or some combination thereof (e.g. reduce both OLE or the sum of the OLE). In other embodiments, reader 403 may not be centered. For example, the skew angle may be determined based on a configuration that prioritizes eliminating one of OLE 404 or OLE 405.

Figure 5:
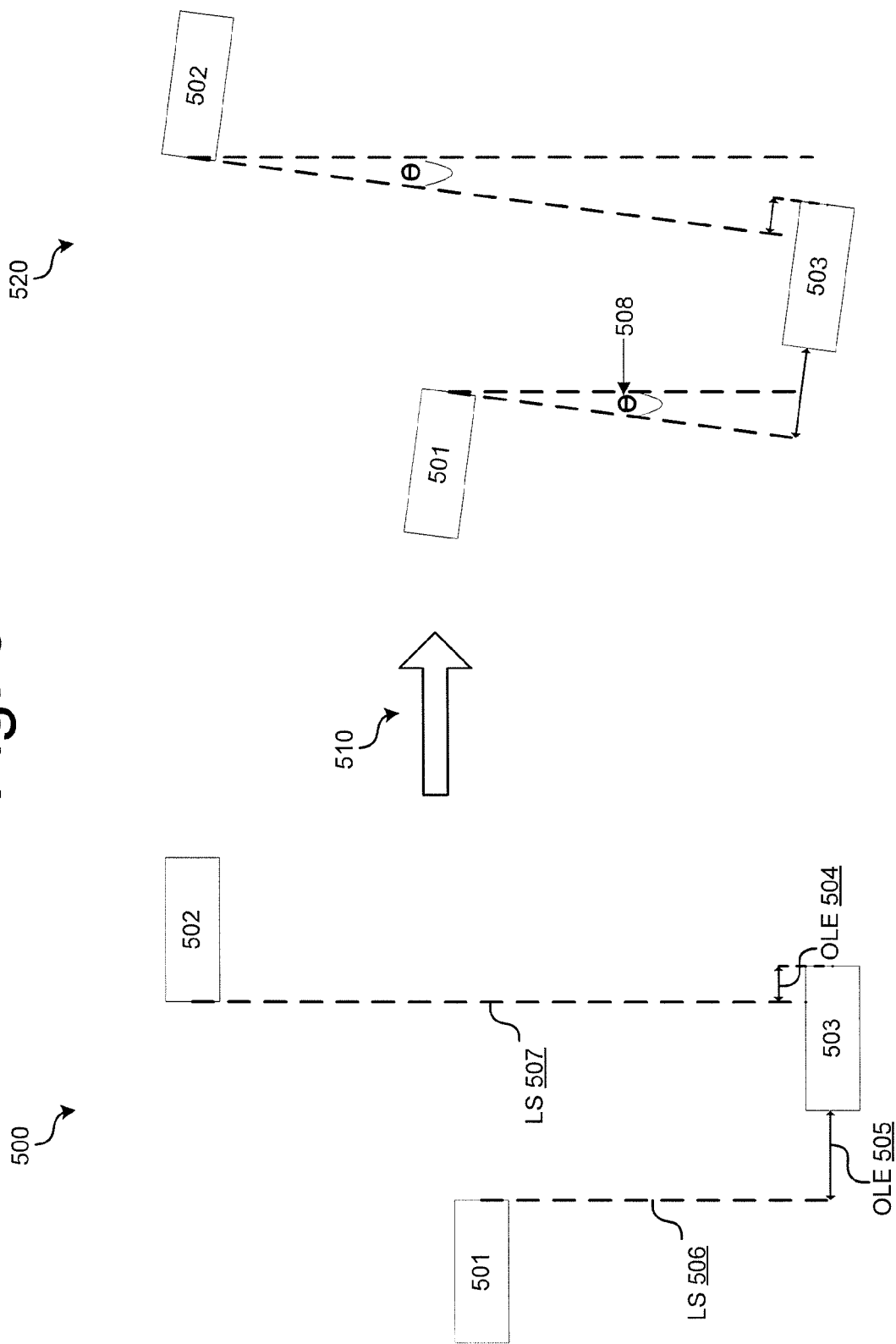
FIG. 5 is a top view illustrating an exemplary three-reader, three-layer TDMR configuration before bonding the slider to the suspension and after bonding the slider to the suspension at a determined bonding skew angle in accordance with the process of FIG. 2.

FIG. 5 is a top view illustrating an exemplary three-reader, three-layer TDMR configuration before bonding the slider to the suspension (configuration 500) and after bonding the slider to the suspension (configuration 520) at a determined bonding skew angle 508 in accordance with the process of FIG. 2. In this exemplary embodiment, three readers 501, 502, and 503 are manufactured on three separate layers. In different embodiments, the relative orientation of the readers may vary. For example, reader 503 may be manufactured in the bottom layer, the middle layer, or the top layer of the three layers. In one embodiment, central reader 503 is at the lowest or highest layer of the three-reader three-layer stack to reduce the skew adjustment effect on the distance between flanking readers 501 and 502.

As illustrated in FIG. 5, there is longitudinal separation 506 between reader 503 and reader 501, and longitudinal separation 507 between reader 503 and reader 502. In alternate embodiments, the two longitudinal separations may be identified in any combination that may be used to derive the longitudinal separation between the bottom layer and middle layer, and the top layer and middle layer. In example configuration 500, there are two overlay errors: OLE 505 between reader 501 and reader 503, and OLE 504 between reader 502 and reader 503. In alternative embodiments, initial configuration 500 may comprise one or no OLE (e.g. reader 503 is aligned with reader 501 and/or reader 502), in which case the bonding skew angle may be zero. Determination of a bonding skew angle 508 may be based on OLE 504, OLE 505, LS 506, LS 507, and other parameters. The bonding skew angle 508 may be determined based on a configuration 520 that centers reader 503 between readers 501 and reader 502. Alternatively, the bonding skew angle 508 may be based on an alternative desired configuration. The slider, initially manufactured in configuration 500, is bonded to a HDD HGA at bonding angle 508 through bonding operation 510, resulting in configuration 520

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

What is claimed is:

1. A method of correcting overlay error (OLE) in a slider comprising a plurality of readers, comprising:
   determining a first OLE between a first reader and a second reader of the slider;
   determining a bonding skew angle of the slider prior to bonding it to a suspension; and
   bonding the slider to the suspension at the determined bonding skew angle.

2. The method of claim 1, wherein the first OLE is determined based on a Scanning Electron Microscope (SEM) image of the plurality of readers at an air bearing surface (ABS).

3. The method of claim 2, wherein the bonding skew angle of the slider is based on the first OLE.

4. The method of claim 1, wherein the bonding skew angle is zero.

5. The method of claim 4, wherein the slider is bonded to the suspension using a skew bin.

6. The method of claim 5, wherein the first reader is on a first layer of the slider, and wherein the second reader is on a second layer of the slider.

7. The method of claim 6, wherein the bonding skew angle is further based on the longitudinal separation between the first layer and the second layer.

8. The method of claim 7, further comprising manufacturing the slider prior to determining the first OLE.

9. The method of claim 8, wherein the slider is a two-dimensional magnetic recording (TDMR) slider.

10. The method of claim 8, wherein the bonding skew angle is further based on a second OLE between the second reader and a third reader.

11. The method of claim 10, wherein the third reader is on the first layer.

12. The method of claim 10, wherein the third reader is on a third layer.

13. The method of claim 7, wherein the bonding skew angle is further based on the width of each of the plurality of readers.

* * * * *